United States Patent [19]

Nolting et al.

[11] Patent Number: 4,516,106
[45] Date of Patent: May 7, 1985

[54] TEMPERATURE SENSING MODULE

[75] Inventors: Peter Nolting, Buhlertal, Fed. Rep. of Germany; Claude Bleger, Duttlenheim, France

[73] Assignee: Robert Bosch GmbH, Stuttgart, Fed. Rep. of Germany

[21] Appl. No.: 586,651

[22] Filed: Mar. 8, 1984

Related U.S. Application Data

[63] Continuation of Ser. No. 399,985, Jul. 19, 1982, abandoned.

[30] Foreign Application Priority Data

Aug. 28, 1981 [DE] Fed. Rep. of Germany ....... 3134166

[51] Int. Cl.$^3$ .............................................. H01C 3/04
[52] U.S. Cl. ..................... 338/28; 374/148; 374/178
[58] Field of Search .................. 338/25, 28; 374/185, 374/178, 148; 236/49

[56] References Cited

U.S. PATENT DOCUMENTS

| | | | |
|---|---|---|---|
| 2,131,065 | 9/1938 | Obermaier | 374/185 |
| 2,398,892 | 4/1946 | Kelly | 338/28 |
| 2,780,703 | 2/1957 | MacIntyre | 338/28 |
| 3,005,171 | 10/1961 | Beckman | 338/28 |
| 3,114,125 | 12/1963 | Werner et al. | 374/185 X |
| 3,286,214 | 11/1966 | Kolb et al. | 374/185 X |
| 3,314,033 | 4/1967 | Wnuk, Jr. | 338/25 X |
| 3,743,180 | 7/1973 | Perkins et al. | 236/49 X |
| 4,243,968 | 1/1981 | Scott | 338/25 X |
| 4,317,102 | 2/1982 | Uranas | 338/25 |
| 4,375,056 | 2/1983 | Baxter et al. | 338/25 |

Primary Examiner—William E. Tapolcai
Attorney, Agent, or Firm—Michael J. Striker

[57] ABSTRACT

A temperature-sensing module is described, including a measuring element sensitive to temperature, such as an NTC resistor. In order to reduce the thermal influence of the housing of the element and of the electrical connection, and also to improve the mechanical stability and resistance against vibrations, the connection wires of the element are attached to conductive webs formed side-by-side on a carrier plate of an electrically and thermally insulating material. The conductive webs at one end have enlarged areas which are connected to the connection wires of the sensitive element, and the connecting part of each web is relatively narrow in cross section and has a meander-like configuration. The transition between the enlarged part and the meander-like part is further restricted in cross section to reduce the thermal influence to a minimum. The other end of the meander-like conductive parts is again enlarged in area and forms a contact terminal points attachable to the pins of the connector plug, for example.

13 Claims, 6 Drawing Figures

TEMPERATURE SENSING MODULE

This application is a continuation of application Ser. No. 399,985, filed July 19, 1982, now abandoned.

BACKGROUND OF THE INVENTION

The present invention relates in general to temperature sensors, and in particular to a temperature-sensing module for use in an air duct of a heating or air-conditioning unit of a motor vehicle. The module includes an electrical temperature-sensitive element, preferably a pill-shaped measuring element such as an NTC resistor having two connection wires acting as supports for the sensor proper. Measuring elements of this kind are conventional and readily available commercially. They are used for temperature measurement in forced or non-forced air streams. It has been found however that the supports of these measuring elements exhibit certain disadvantages. For example, a sufficient mechanical stability is achievable only at relatively thick connection wires or at short ties of thin connection wires to webs, ribs or tongues formed on a housing. Heat transfer to the air stream cannot be adjusted and, due to uncontrollable heat transfers, erroneous readings of measured values may result.

SUMMARY OF THE INVENTION

It is an object of the invention to provide a novel and improved temperature sensor of the aforedescribed type which in comparison to prior art has the advantage that heat flow from and to the measuring element, and to and from the housing, is substantially reduced.

In keeping with these objects, and others which will become apparent hereafter, one feature of the invention resides in the provision of a carrier body made of an electrically insulating material having poor thermal conductivity, a pair of conductive webs mounted on the carrier body, each web defining an enlarged end portion and a relatively narrow terminal portion of a meander-like configuration, the enlarged end portion being connected to an assigned connection wire of the temperature-sensitive element.

It is of particular advantage when the connection between the enlarged end portion and of the meander-like terminal portion is restricted so as to provide an additional obstacle to heat flow.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
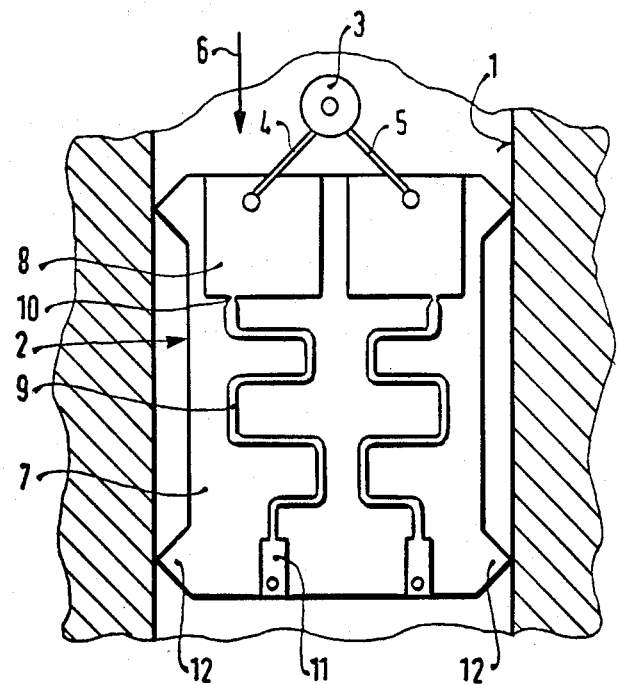
FIG. 1 is a plan view of a first embodiment of the temperature-sensing module according to this invention.

Referring firstly to FIG. 1, it will be seen that reference numeral 1 indicates an air duct of a heating or air-conditioning unit of a motor vehicle, in which a temperature-sensing module 2 is installed. The module 2 includes a pill-shaped measuring element 3 which may be a commercially available NTC-resistor having two connection wires 4 and 5. The connection wires are oriented away from the temperature-sensitive resistor 3 in the direction of air stream as indicated by arrow 6. Both wires 4 and 5 act simultaneously as a support for the resistor and as temperature-sensing surfaces exposed to the air stream 6 passing through the duct 1. The ends of connection wires 4 and 5 are electrically and thermally connected, for example by soldering, to conductive webs 8 which are supported on an electrically insulating carrier body 7 having poor thermal conductivity. In the example according to FIG. 1, the carrier body 7 is in the form of a plate of Pertinax or other suitable synthetic material having electrical insulating qualities and poor heat conductivity, upon which are bonded conductive webs similarly as in the conventional printed circuits. Each conductive web has an enlarged surface 8 in the range of connection points to the wires 4 and 5 of the sensor 3. The connection wires 4 and 5 are relatively short. The ends of the connection wires are inserted into a corresponding hole in the plate 7 and secured to the enlarged areas 8 of the conductive webs by soldering, for example.

The enlarged conductive area 8 transitions into a narrow conductive strip 9 having a meander-like configuration and extending in direction of flow of the air towards the downstream or rear edge of the carrier plate 7. In addition, the transition area 10 between the enlarged part 8 and the narrow strip 9 of the webs is further restricted in cross section. The opposite end of each meander-like conductive strip 9 is again enlarged in area to form terminal conductive surfaces 11 which have soldered to them electrical connection wires.

It will be seen from FIG. 1 also that the rectangular carrier plate 7 is provided at each end of its lateral edges with triangular projections 12. The clearance between the tips of opposite projections matches the inner diameter of the air duct 1 so that the entire sensing module snugly fits into the air duct and is held therein in a fixed position.

The temperature-sensing module of this invention operates as follows:

The measuring element 3, its connection wires 4 and 5 and the enlarged conductive surfaces 8 are warmed up to the temperature of the air stream and the resistance of the NTC resistor 3 is proportional to the sensed temperature. The resistance and the resistance changes are transmitted as a measuring signal via the terminal contacts 11 to a regulating or control unit of a heating or air-conditioning device in a motor vehicle. By virtue of this arrangement, the sensing module has an excellent mechanical stability in spite of thin connection wires, and this mechanical stability is of particular importance when the module is used in an environment which is exposed to vibrations. By suitable selection of the size of the enlarged temperature-sensing conductive surfaces 8 it is possible to adjust the temperature sensitivity of the module so as to promptly respond to temperature changes even at low flow speeds of the air in the duct 1. Due to the meander-like configuration of the narrow conduits 9, and particularly due to the restriction between the conduits 9 and the enlarged conductive surfaces 8, heat transfer between the electrical conductors attached to terminals 11 and the heat-sensing surfaces 8 is considerably reduced, and the danger of false reading of measured values is avoided. Also, the triangular clamping projections 12 contacting the air channel 1 at single points only serve the same purpose, namely the prevention of heat transfer between the carrier body 7 and the walls of the air channel 1.

Figure 2:
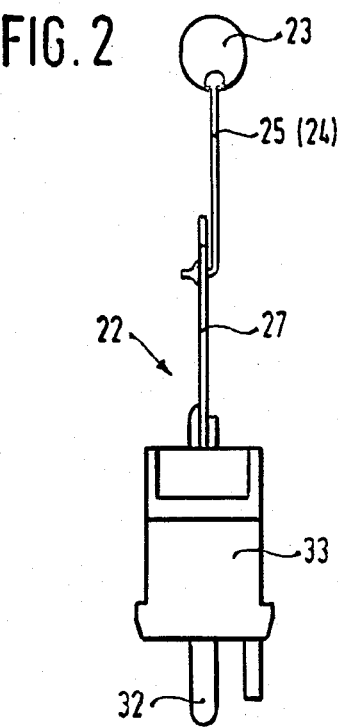
FIG. 2 is a side view of another embodiment of the temperature-sensing module.
Figure 3:
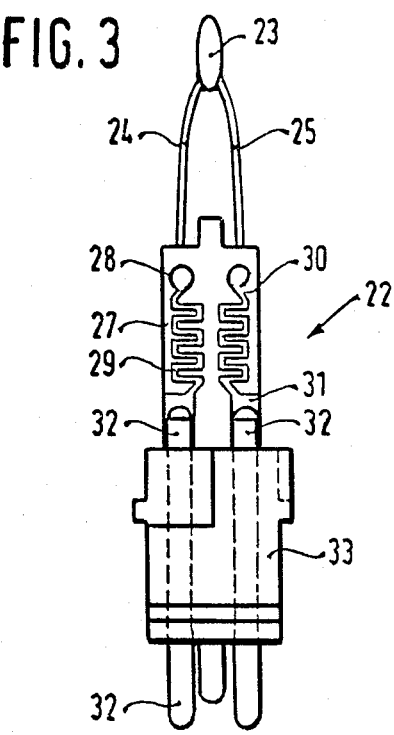
FIG. 3 is a front view of the module of FIG. 2.

A second embodiment of this invention is illustrated in FIGS. 2 and 3. Similarly as in FIG. 1, the temperature-sensing module 22 includes again a sensing element 23 in the form of NTC resistance pill having two connection wires 24 and 25, similarly as in the preceding embodiment. The ends of the connection wires are connected to conductive webs on the carrier plate 27 by soldering. In the connection area, the meander-like conductive webs 29 are enlarged in area to form temperature-sensing surfaces 28. Also the transition region 30 between the meander-like conductive webs 29 and the enlarged temperature-sensitive web portions 28 are restricted in order to reduce heat transfer. The end of conductors 29 opposite the surfaces 28 is again enlarged in area to form contact surfaces 31. Each of the contact surfaces 31 is connected by soldering to a contact pin of a plug 33. Preferably, the plug body 33 is made of a synthetic material and the upper part of the pin as well as the rear edge of the carrier body 27 are embedded in the synthetic material. The projection pin portions are in alignment with the longitudinal extension of the carrier body 27.

The operation of this embodiment of the temperature sensor is the same as that of the first embodiment. This embodiment has the advantage that the installation into an air duct is greatly facilitated, due to the provision of the plug connector 33.

Figure 4:
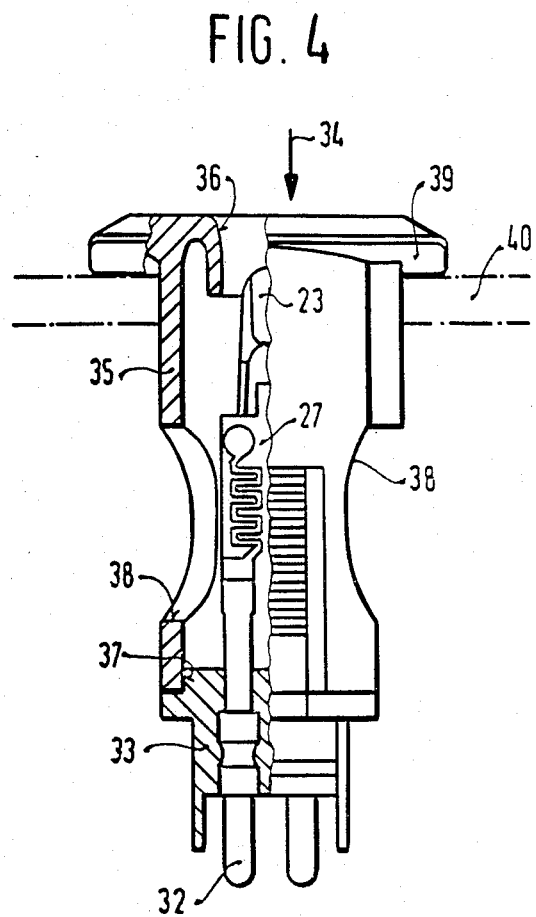
FIG. 4 is the module of FIGS. 2 and 3 installed in an air duct.

FIG. 4 shows an example of how the embodiment of FIGS. 2 and 3 can be installed in the air duct. The temperature-sensing module proper together with the carrier body 27 are arranged in a tubular air-guiding part 35. The upper end opening 36 of the air duct 35 is in the form of an intake nozzle. The measuring element 23 is located in the range of the flow nozzle 36. The opposite end of the air-guiding sleeve 35 is also formed with an opening 37 snugly fitting with the connector body 33. The cylindrical wall of the sleeve 35 is provided with two opposite openings 38 acting as discharge openings for the air stream.

The modular unit illustrated in FIG. 4 represents a temperature sensor for the inner space of a motor vehicle. For example, it can be installed in a mounting hole in the lining of the interior of the vehicle in such a manner that a flange 39 at the intake opening of the sleeve 35 abuts against the inner wall 40 indicated by dashed lines. Due to the slight overpressure in the interior of the motor vehicle, air streams through the intake nozzle 36 past the measuring element 23. Due to the streamlined configuration of the intake nozzle 36, the air flows at an increased rate past the measuring element 23 and is discharged again through the transverse or lateral openings 38. The plug 33 is received in a conventional connector socket electrically connected to a non-illustrated measuring device.

Figure 5:
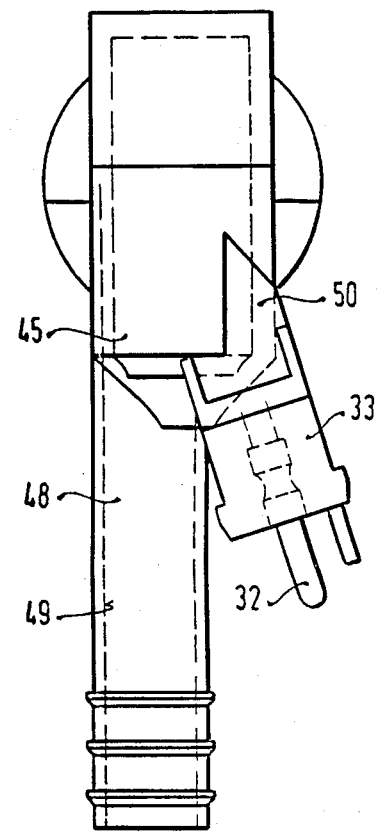
FIG. 5 shows the installation of the module according to FIGS. 2 and 3 in another air duct.
Figure 6:
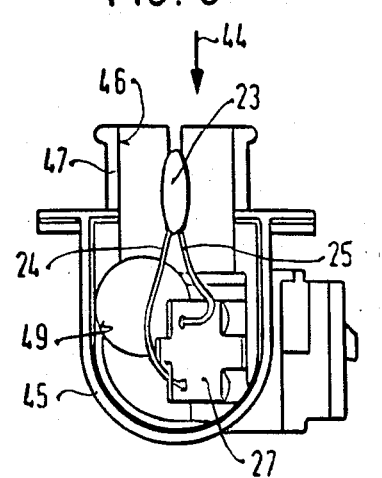
FIG. 6 is a top view of the air duct of FIG. 5.

Still another mode of installation of the temperature-sensing module according to FIGS. 2 and 3 is illustrated in FIGS. 5 and 6. In the latter embodiment, the air duct 45 has the form of an elbow pipe. Connecting wires 24 and 25 of the temperature-sensing element 23 are bent so that the measuring element proper can be located in the intake opening of the upper part 47 of the elbow pipe, similarly as in the example according to FIG. 4. The other part 48 of the air duct is in the form of a connection piece which can have an air hose attached to it. The air duct 49 in the interior of the pipe portion 48 opens into the upper part 47 in the proximity of the carrier body 27.

The carrier body 27 extends substantially in direction of the lower part 48 of the elbow, but as will be seen from FIG. 5, arranged in a housing attachment 50 outside the pipe part 48.

Again, the operation of this embodiment is substantially the same as in the preceding example. Due to the forced air stream from the air suctionhose attached to the pipe connection 48 and producing an underpressure in the elbow pipe, an intensive air stream flows in the direction of arrow 44 and sweeps over the sensor 23, connection wires 24 and 25 and the increased portions 28 of the conductive webs. The air stream is then discharged through a discharge channel 49 in the air duct 45. The connector plug 33 in the embodiment according to FIG. 6 is inserted into a connector socket connected to a non-illustrated control device for processing the measured values.

It is of course possible to form the sensing modules 2 and 22 with conductive webs 9, 29, 10 and 30 embedded at least partially in the material of the carrier body 7 or 27 so that the conduits are better insulated from the measured medium both electrically and thermally.

It will be understood that each of the elements described above, or two or more together, may also find a useful application in other types of constructions differing from the types described above.

While the invention has been illustrated and described as embodied in specific examples of temperature-sensing modules, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A gas temperature-sensing module for use in an air duct of a heating or air-conditioning system of a motor vehicle, including an electrical temperature-sensitive element provided with connection wires which simultaneously act as a support for the sensitive element, comprising a carrier body of an electrically insulating material having poor thermal conductivity; a pair of conductive webs arranged on said carrier body and each defining an enlarged end portion connected to an assigned connection wire, and a relatively narrow connection part having a meander-like configuration and being formed at its free end with a terminal contact area electrically connectable to said system; and supporting means attached to a minor part of said carrier body and being engageable with said air duct whereby said sensitive element together with major parts of said carrier body and said conductive webs are directly exposable to a gas stream in said air duct while only the minor part of said carrier body and the terminal contact area of said meander-like connection parts are in a direct mechanical contact with said duct and the rest of said system.

2. A temperature-sensing module as defined in claim 1, wherein the part of each conductive web between the enlarged end portion and the meander-like connection part is reduced in cross section.

3. A temperature-sensing module as defined in claim 2, wherein the meander-like connection parts of said conductive webs are partially embedded in said carrier body.

4. A temperature-sensing module as defined in claim 2, wherein said carrier body has the form of an elongated plate.

5. A temperature-sensing module as defined in claim 4, wherein said meander-like connecting parts of said webs are arranged side-by-side on said plate.

6. A temperature-sensing module as defined in claim 5, wherein said plate has a rectangular configuration defining relatively long lateral edges and relatively narrow end edges, and said sensitive element being attached to the enlarged areas of said conductive webs at one of said narrow edges.

7. A temperature-sensing module as defined in claim 6, wherein the meander-like connecting parts of said conductive webs are provided with enlarged terminal contact areas adjoining the narrow edge remote from connection points for the wires of said sensitive element.

8. A temperature-sensing module as defined in claim 7, further comprising a plug member provided with connector pins which are electrically connected to the enlarged terminal contact surfaces, and the plug member being rigidly connected to the carrier plate in the range of said narrow edge.

9. A temperature-sensing module as defined in claim 8, wherein said plug member is made of a plastic material in which said carrier body is embedded.

10. A temperature-sensing module as defined in claim 5, wherein the opposite lateral edges of said plate are provided with triangular projections snugly fitting into the air duct into which the module is to be installed.

11. A temperature-sensing module as defined in claim 1; further including a sleeve-shaped air conduit defining at one end thereof an opening in the form of a flow nozzle, and said temperature-sensitive element being located within or in close proximity to said flow nozzle.

12. A temperature-sensing module as defined in claim 11, wherein the other end of said air conduit is coaxially attached to a connector plug body which supports the carrier plate of said module, and the lateral wall of the sleeve-like air conduit in close proximity to said connector plug is provided with a transverse discharge opening for discharging the air stream.

13. A temperature-sensing module as defined in claim 12, wherein the air conduit is in the form of an elbow pipe provided in its jacket with a mounting opening, said connector plug connecting with the sensing module being attached at an angle to said mounting opening and the support wires of said sensitive element being bent so that the sensitive element proper is in the range of the intake nozzle of the air conduit while the carrier body for the conductive webs is located within the lower arm of the elbow pipe.

* * * * *